Jan. 25, 1944.  W. A. WEIGHTMAN  2,339,826
CENTER SILL
Filed Aug. 1, 1940   11 Sheets-Sheet 5

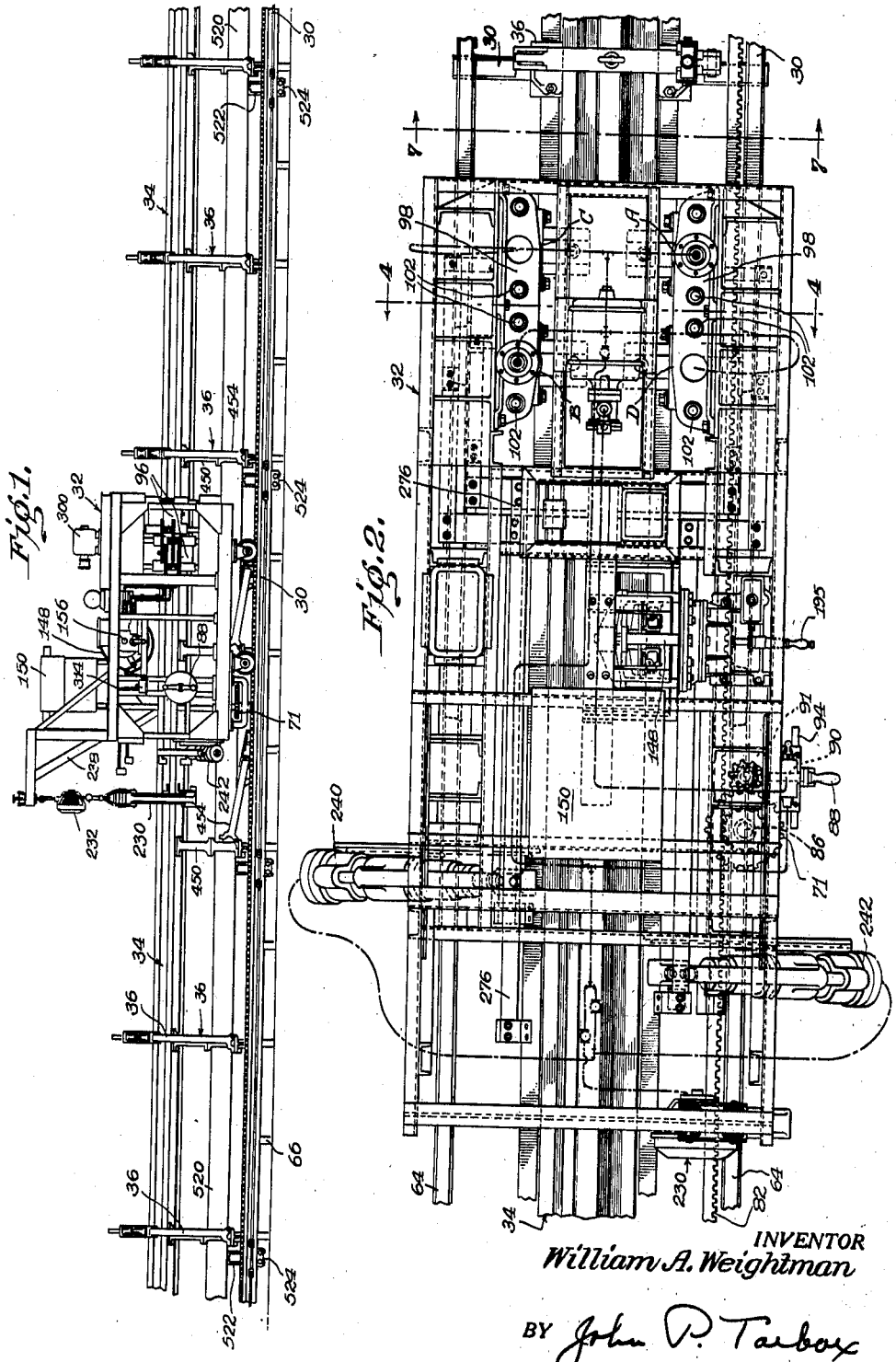

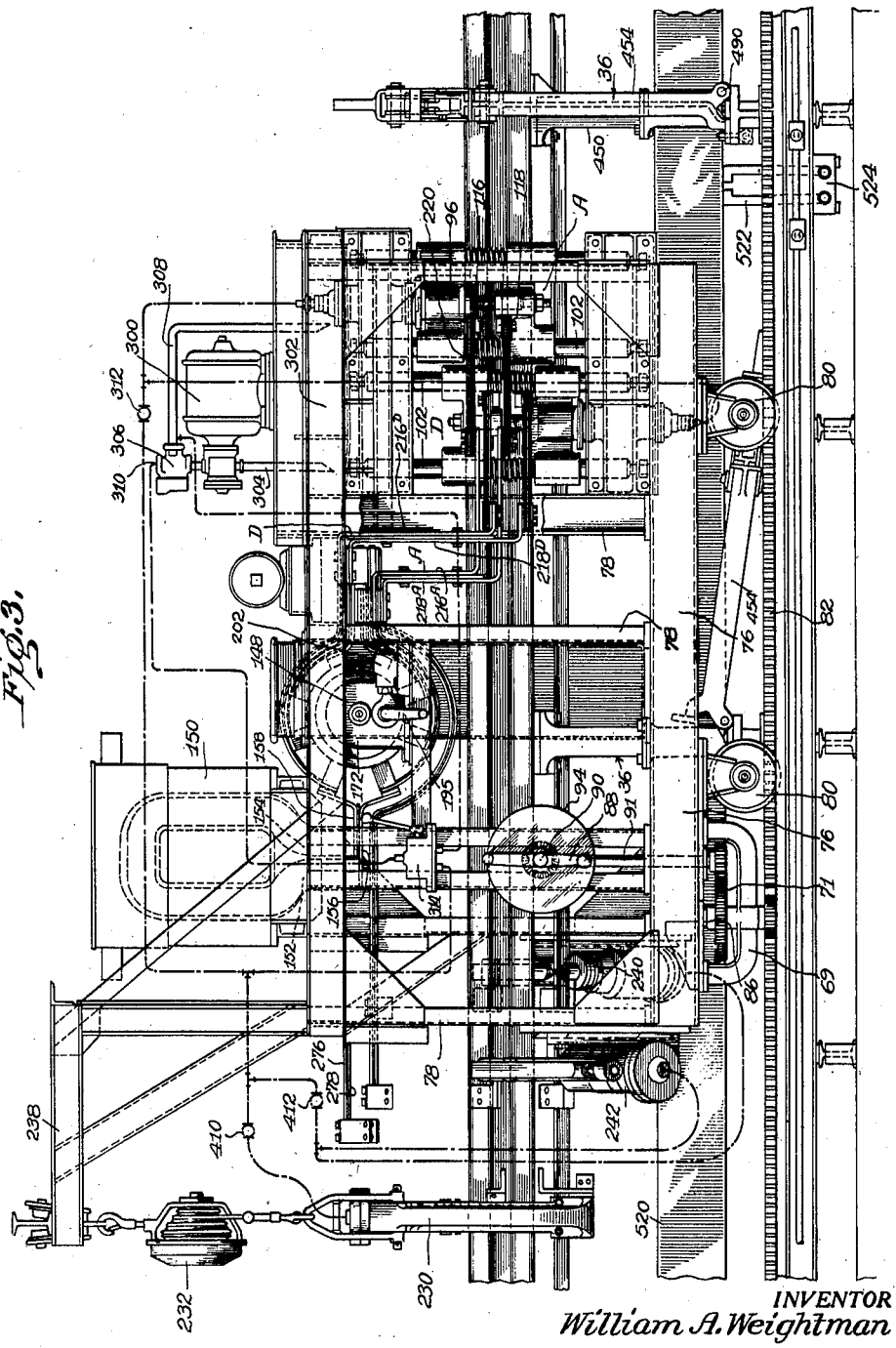

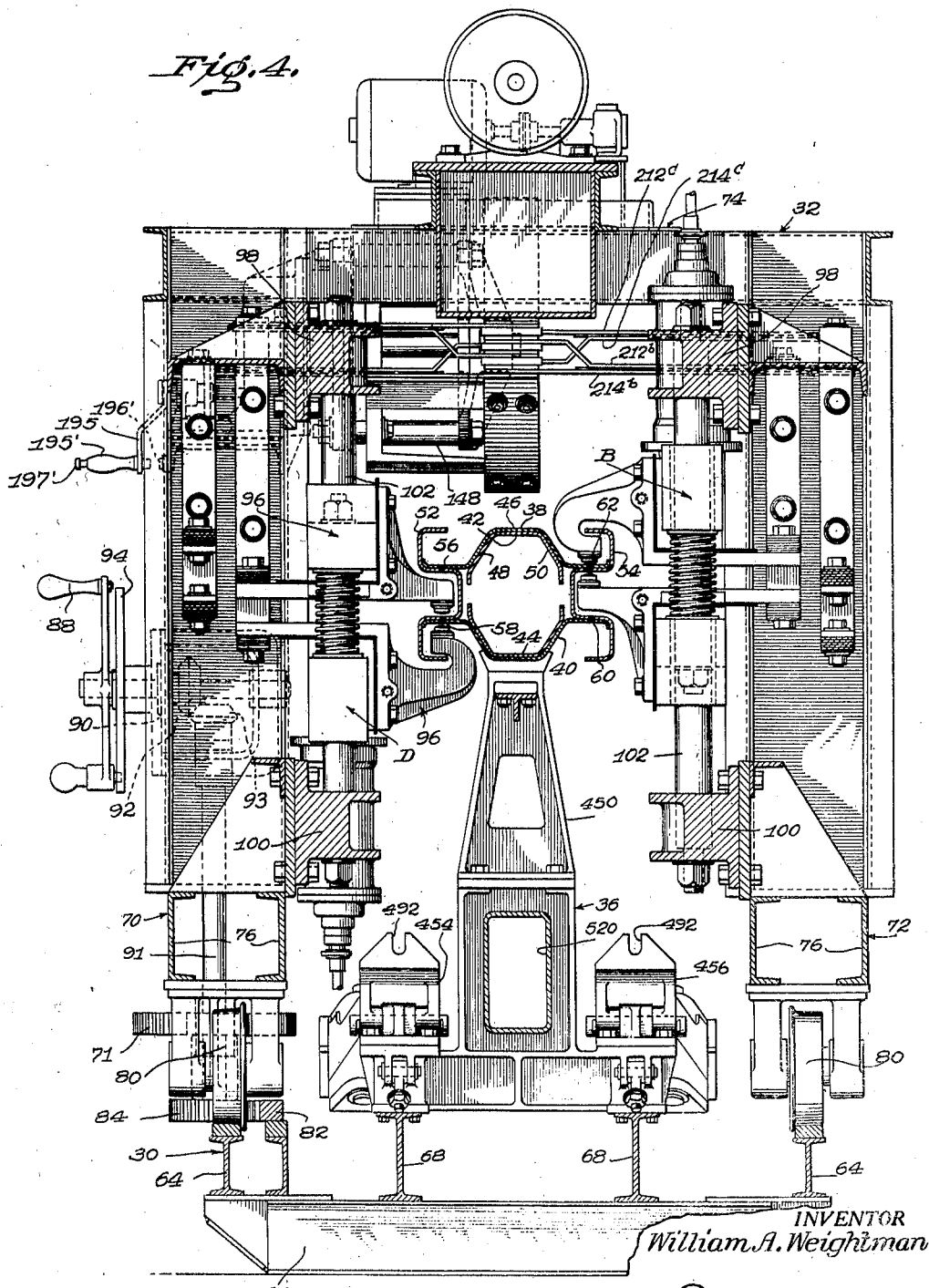

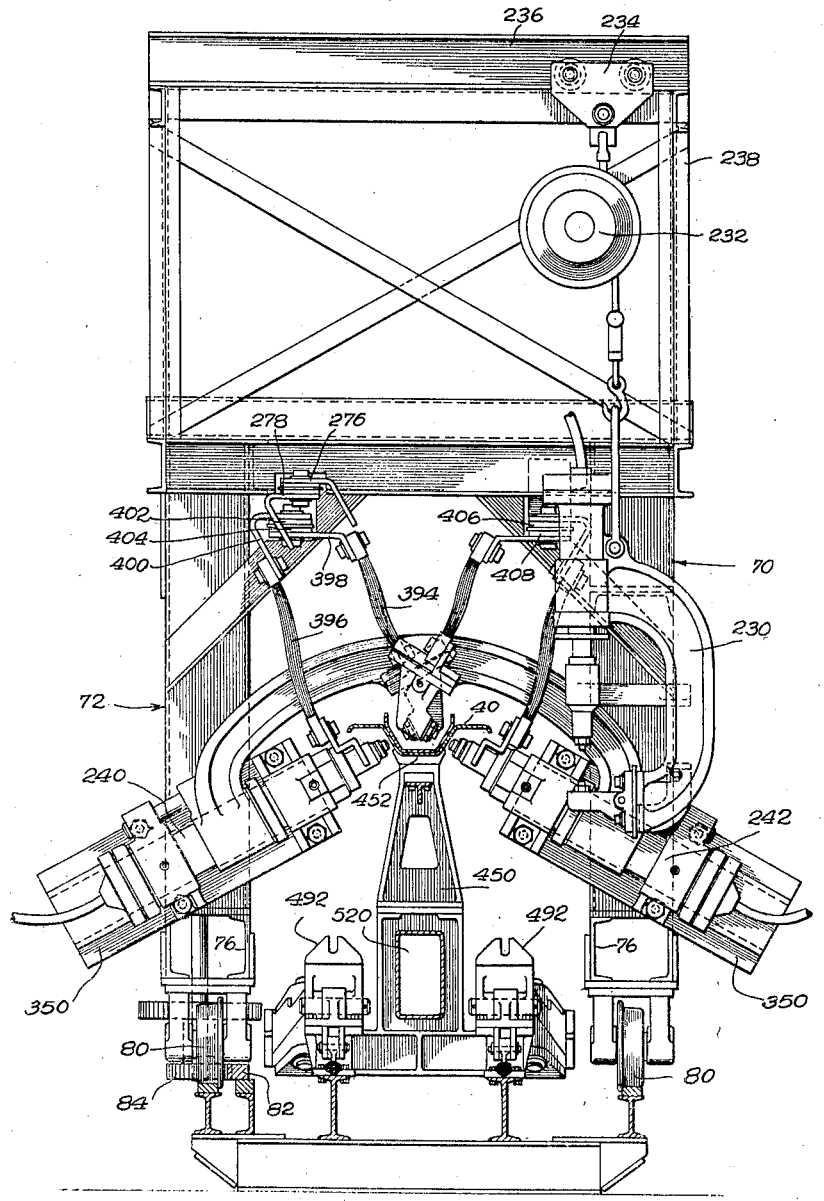

INVENTOR
William A. Weightman
BY John P. Tarbox
ATTORNEY

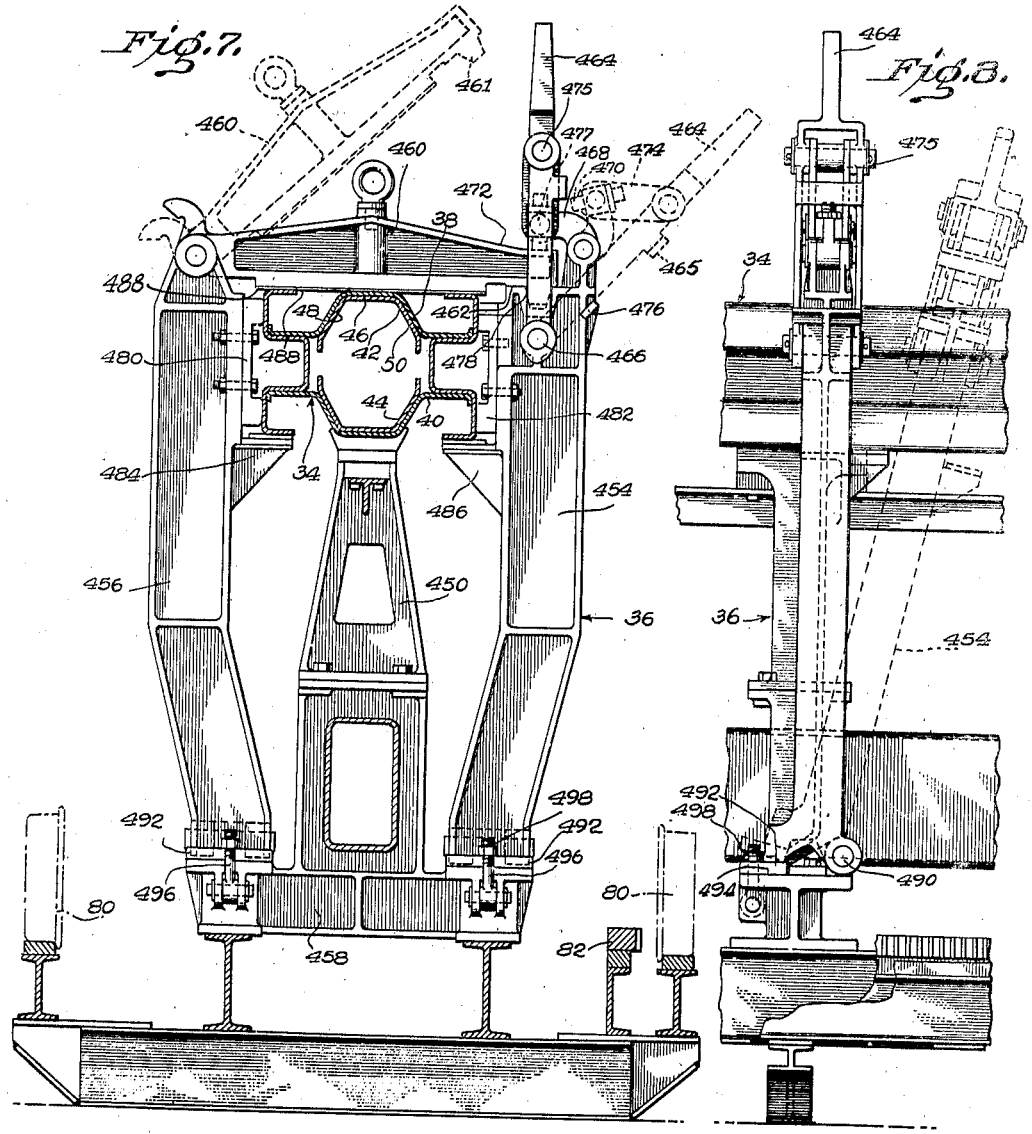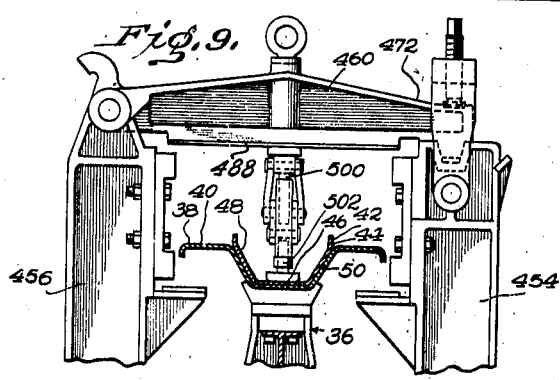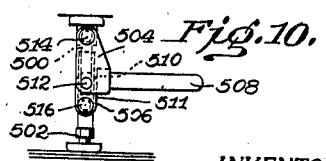

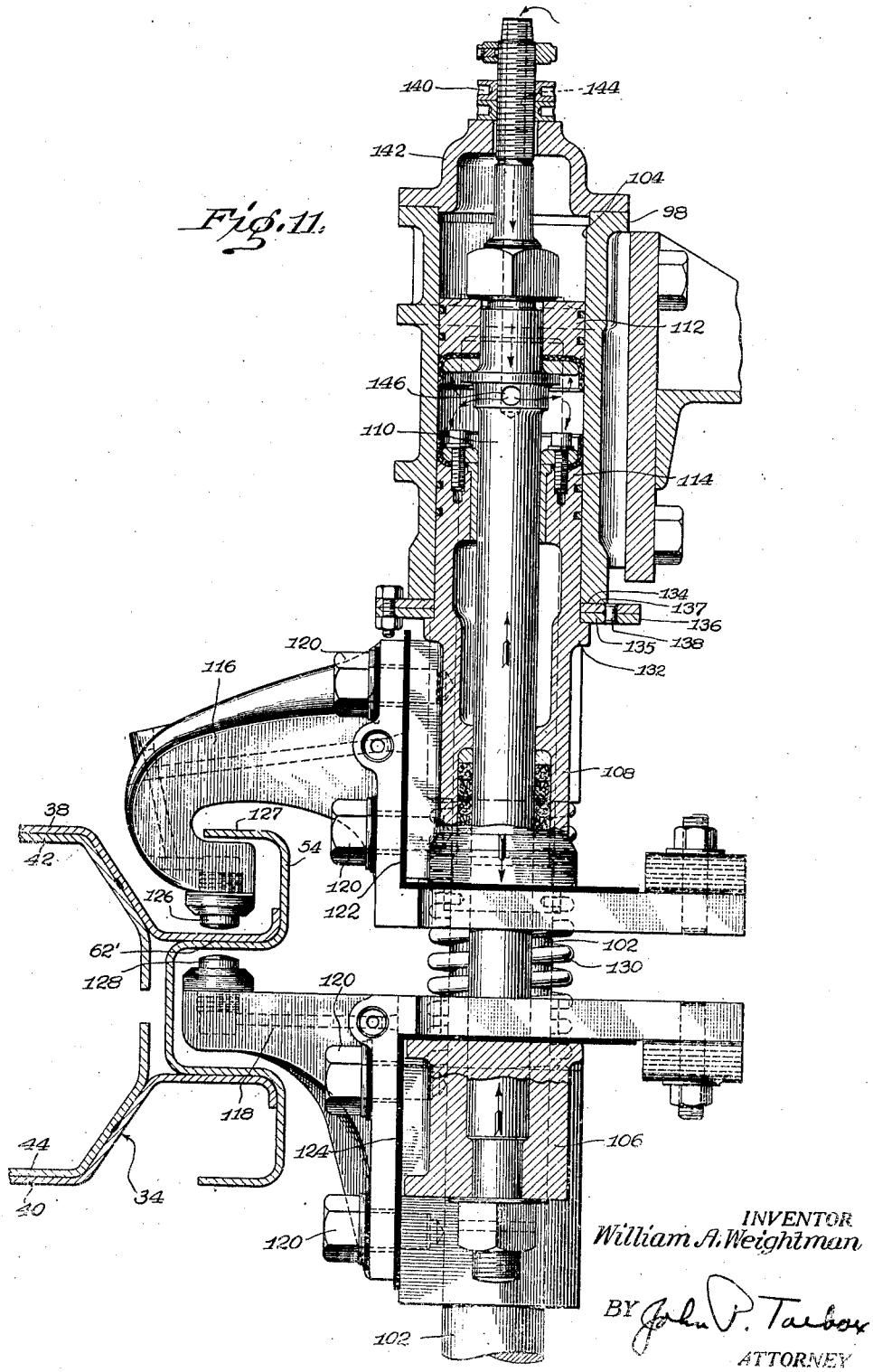

Jan. 25, 1944.  W. A. WEIGHTMAN  2,339,826
CENTER SILL
Filed Aug. 1, 1940   11 Sheets-Sheet 8
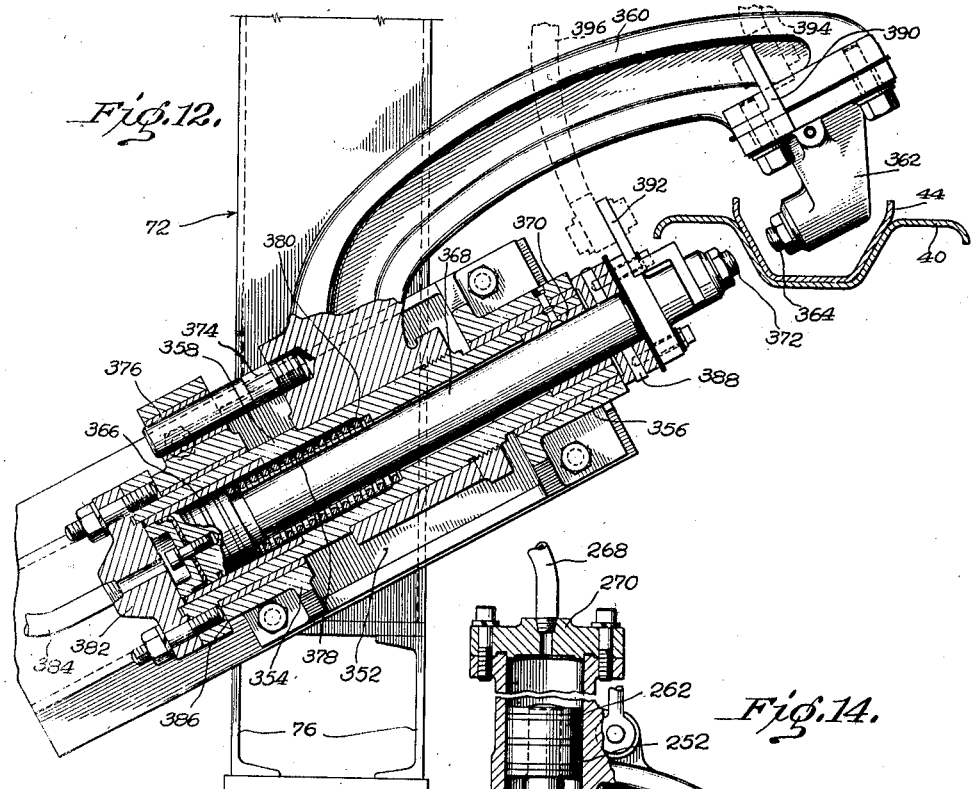
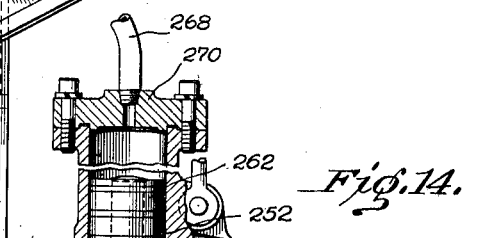
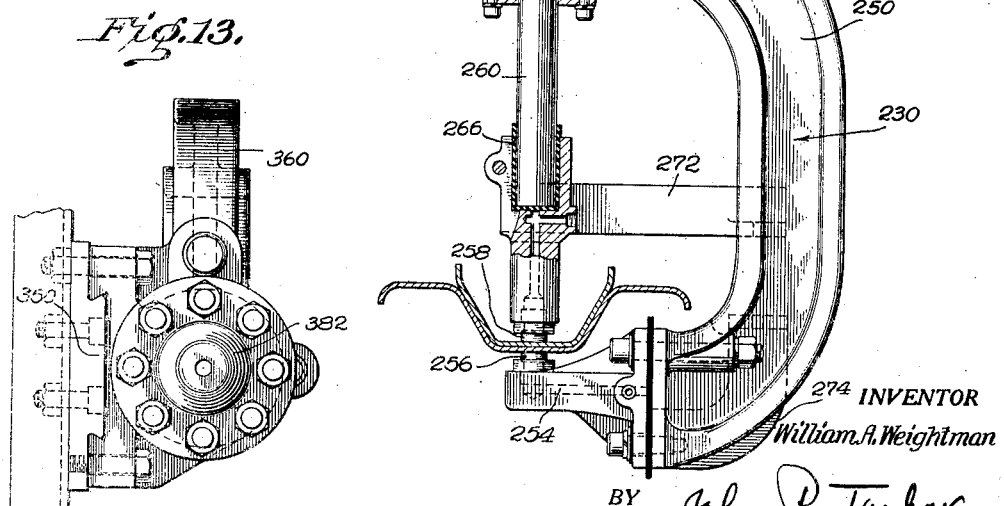
INVENTOR
William A. Weightman
BY John P. Tarbox
ATTORNEY

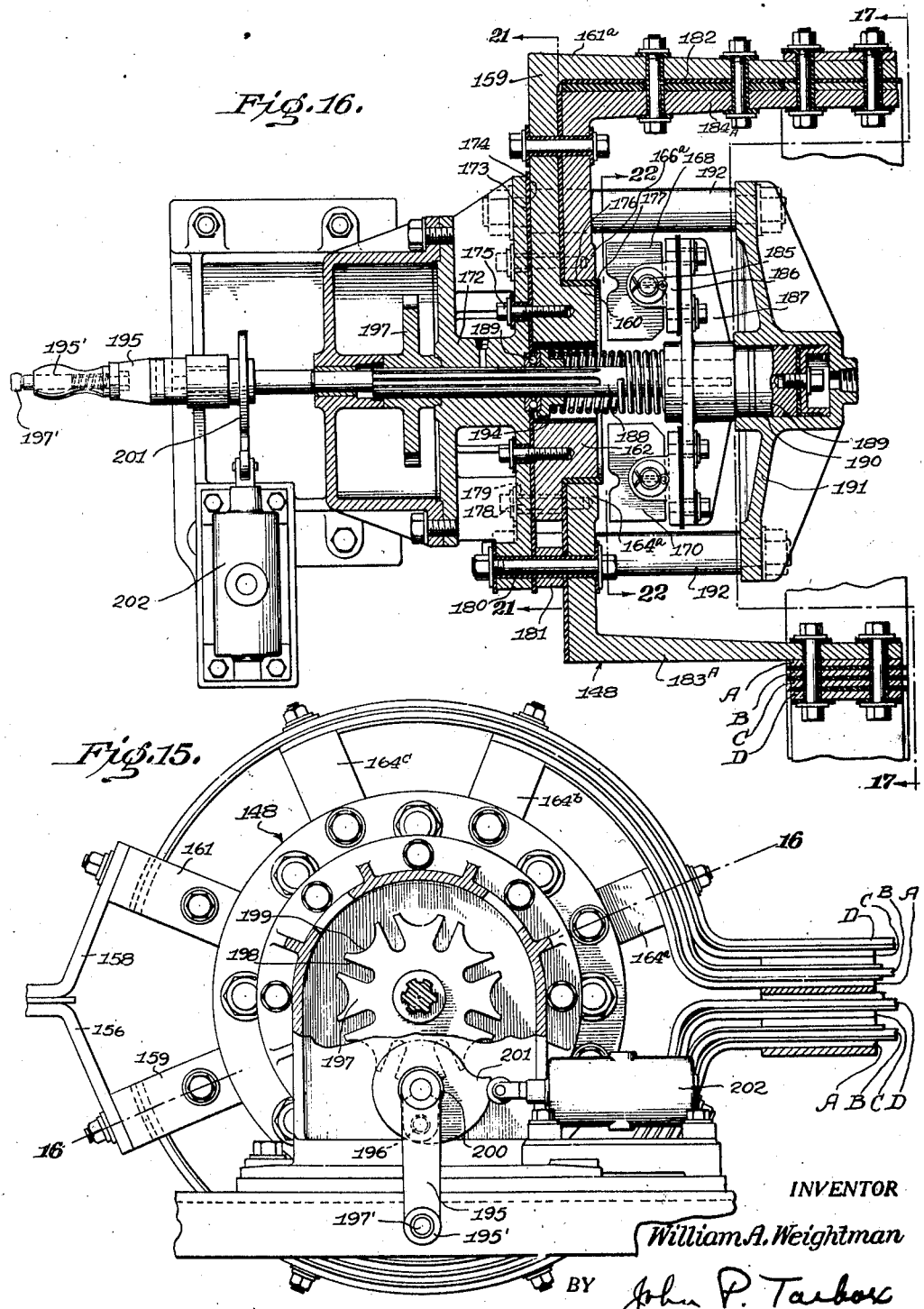

Jan. 25, 1944.  W. A. WEIGHTMAN  2,339,826
CENTER SILL
Filed Aug. 1, 1940   11 Sheets-Sheet 10
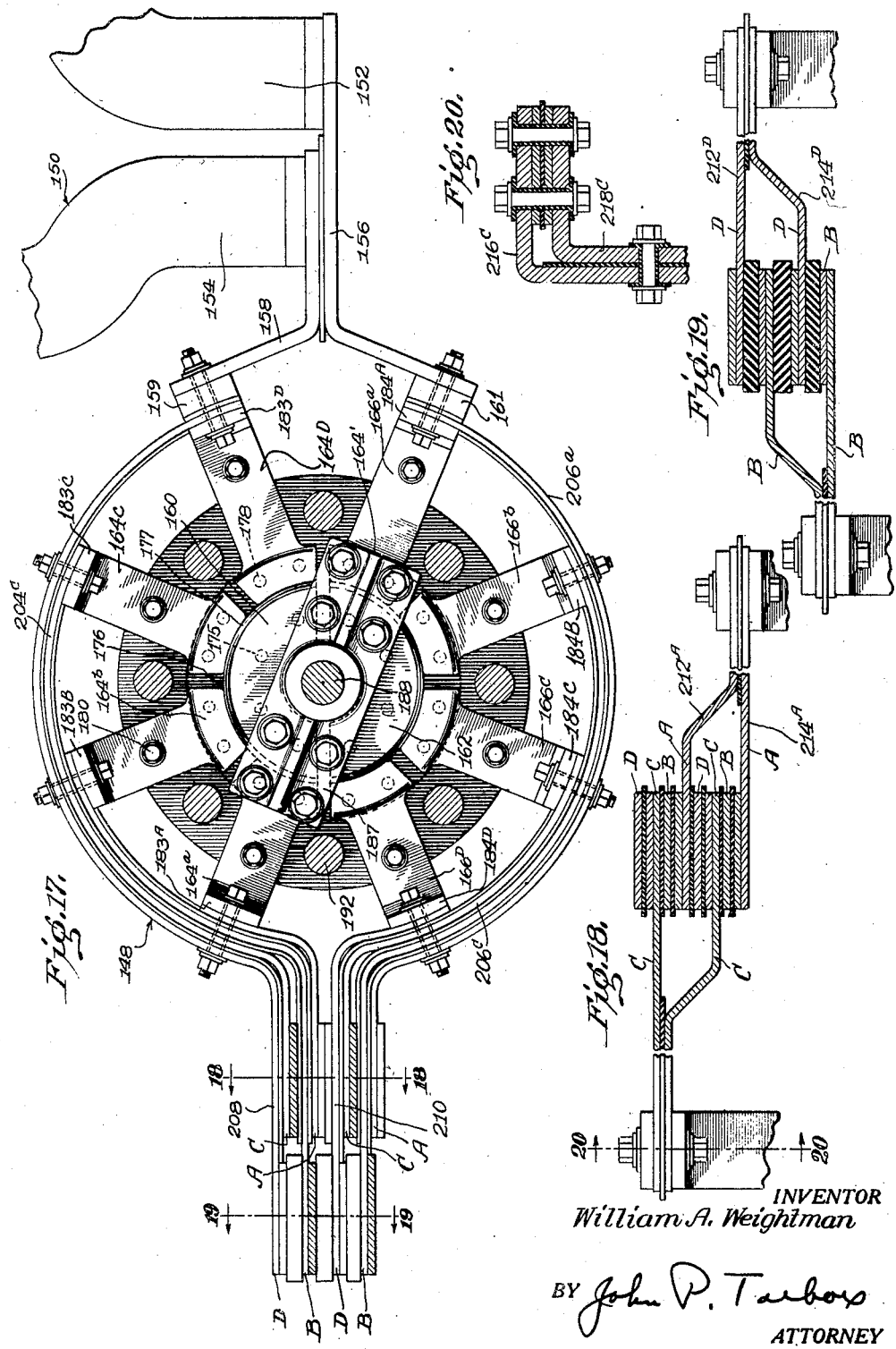
INVENTOR
William A. Weightman
BY John P. Tarbox
ATTORNEY

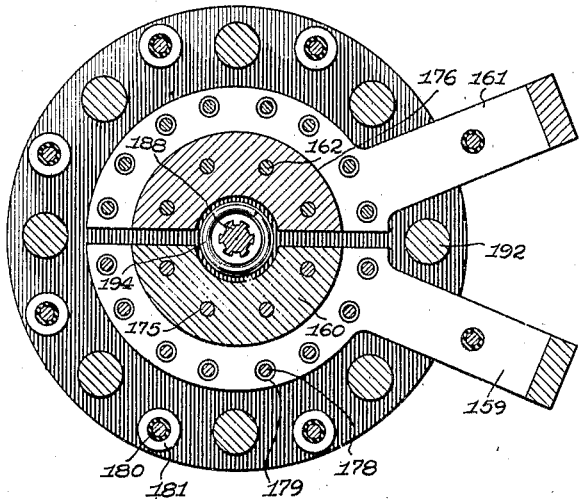
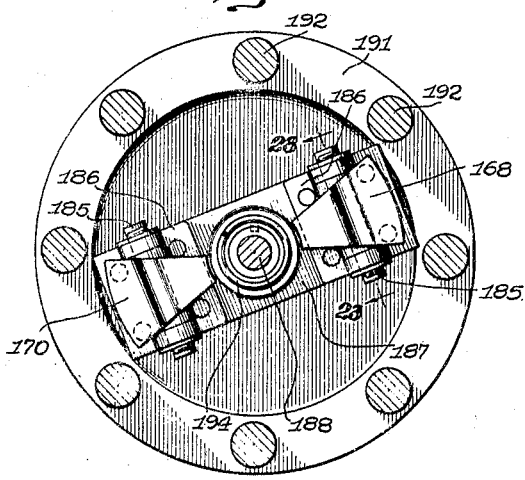
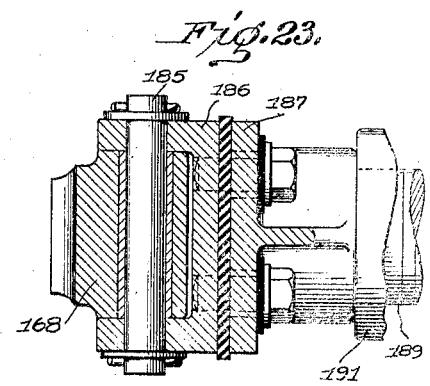

Patented Jan. 25, 1944

2,339,826

UNITED STATES PATENT OFFICE 2,339,826

CENTER SILL

William A. Weightman, Philadelphia, Pa., assignor to Edward G. Budd Manufacturing Company, Philadelphia, Pa., a corporation of Pennsylvania Application August 1, 1940, Serial No. 349,308

16 Claims. (Cl. 219—4)

This invention relates to welding apparatus and more particularly to an apparatus for effecting a plurality of spot welds along the length of a beam or like member having substantially uniform cross section throughout its length.

In the fabrication of beams from strip stock rolled into various channel shapes, for example, it is important that the various component parts of the beam be secured together in proper and uniform manner at uniformly spaced points along the length in order that the beam may have the resultant strength contemplated at all points. The present invention relates to an apparatus adapted to secure together the component parts of a beam structure as by spot welding the parts at uniformly spaced intervals. An application of the machine has been made for the assembly of a plurality of channel members, rolled from flat strip stock, into a center sill adapted for use in railway cars. The particular sill construction for which the machine herein disclosed has been adapted forms the subject matter of application Serial No. 296,026, filed September 22, 1939.

An object of the invention is to provide a machine for securing together relatively heavy members at uniformly spaced points along the length of the members.

Another object of the invention is to provide an apparatus for supporting an elongated beam structure, for supporting a movable carriage for movement along the length of the beam structure together with apparatus upon the carriage for performing operations upon the beam structure at uniformly spaced intervals or otherwise at will.

A further object of the invention is to provide, in an apparatus of the type described, readily operable control means whereby an operator may quickly effect certain operations upon a beam at a particular stage and quickly move on to an adjoining stage for repeated operation.

Still another object of the invention is to provide an apparatus for effecting a plurality of spot welds at various stages along the length of a substantially uniform cross section beam and in which a distributor is employed in the welding circuits whereby a single transformer may successively supply energy to the various points to be welded at each stage.

Yet another object of the invention is to provide an improved fluid pressure operated distributing switch for a plurality of welding guns and in which substantially uniform distribution of current through the switch and to the various guns may be effected.

A further object of the invention is to provide a welding gun structure particularly of great rigidity and adapted to effect heavy welds together with a floating mounting for the same.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

Referring to the drawings in which like reference characters indicate like parts throughout, Figure 1 is a side elevation of an extensive portion of the apparatus illustrating the features of the work support and track and a welding carriage traversable thereon.

Figure 2 is an enlarged top plan view of the carriage shown in Figure 1.

Figure 3 is an enlarged side elevation of the welding carriage.

Figure 4 is a transverse section taken adjacent one end of the carriage substantially on the line 4—4 of Figure 2.

Figure 5 is an end elevation of the left-hand end of the carriage as illustrated in Figures 1, 2 and 3, the track, work support and work being indicated in section.

Figure 7 is an end elevation of a work holding clamp taken substantially on the line 7—7 of Figure 2.

Figure 8 is a side elevation of the work holding clamp of Figure 7.

Figure 9 is a fragmentary end elevation of the work support of Figure 7 as modified for one particular operation in conjunction with the particular beam disclosed.

Figure 10 is a side elevation of a detail of Figure 9.

Figure 11 is a longitudinal section through one of the welding guns illustrated in Figure 6, the section being taken axially through the cylinder and at right angles to the plane of the support of the gun.

Figure 12 is an enlarged side elevation partially in longitudinal section through one of the acutely arranged welding guns illustrated on the left-hand end of Figures 1 to 3.

Figure 13 is an end elevation of the gun of Figure 12.

Figure 14 is a side elevation partly in section of a welding gun adapted to perform one of the operations, the same being located upon the left-hand end of the machine as is indicated partly in Figures 1 and 3.

Figure 15 is a detailed view partly in elevation and partly in section of the distributor switch operating mechanism.

Figure 16 is a section through the distributor switch of Figure 15 taken substantially on the line 16—16 thereof.

Figure 17 is a section taken substantially on the line 17—17 of Figure 16.

Figure 18 is a section through the bus bars taken substantially on the line 18—18 of Figure 17.

Figure 19 is a section through a part of the bus bars taken substantially on the line 19—19 of Figure 17.

Figure 20 is a section taken substantially on the line 20—20 of Figure 18 and illustrating a detail of the bus bars.

Figure 21 is a section taken on the line 21—21 of Figure 16 illustrating a detail of the distributor switch.

Figure 22 is a section through the distributor switch of Figure 16 taken substantially on the line 22—22 thereof, and Figure 23 is a section taken on the line 23—23 of Figure 22 showing the details of the distributor switch connecting block and its support.

Figure 6:
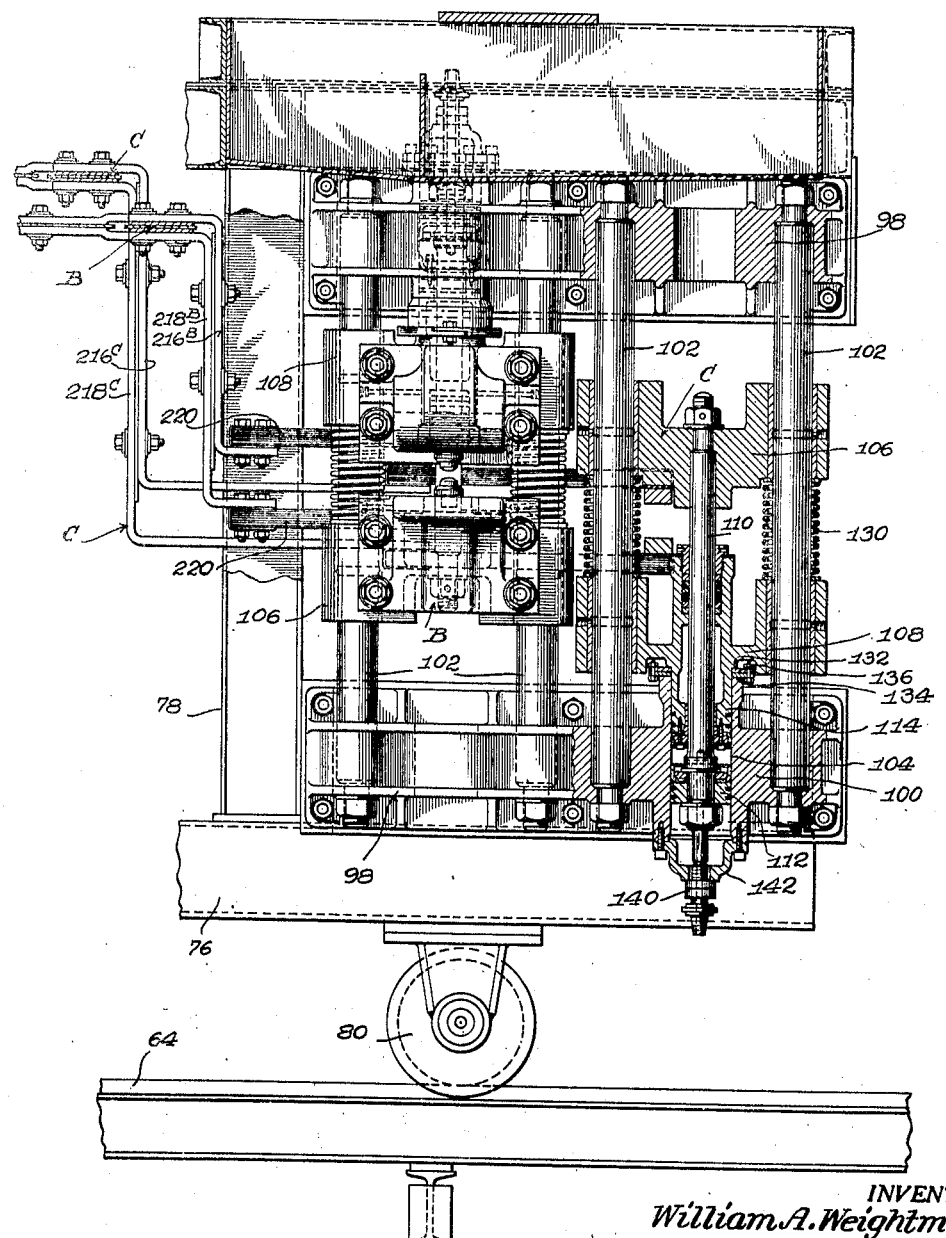
Figure 6 is an enlarged side elevation of a pair of vertical welding guns illustrated in Figure 3, one being illustrated in section along its vertical axis.

Referring to Figure 1 and also Figure 2 wherein the general arrangement of the apparatus is shown, there will appear a track 30 having a carriage 32 thereon adapted to operate upon a work-piece 34 such as an extended column or beam, the latter being supported upon the spaced support arms 36 arranged along the length of the track. Taking into consideration the particular beam to be operated upon as illustrated in conjunction with Figure 4 or Figures 7 and 9 and others, it will appear that the various component parts of the beam are to be secured together at certain points and preferably at uniformly spaced intervals along their length. For example, the center sill or column structure illustrated is composed of top and bottom members 38 and 40 which have been channeled in the manner illustrated by drawing through a suitable draw bench. The top and bottom members 38 and 40 are centrally reinforced by inner reinforcing channel members 42 and 44. Initially before the final assembly of the various component parts of the sill, the reinforcing members 42 and 44 are secured to the top and bottom members 38 and 40 in two separate operations involving the effecting of a plurality of welds at the points 46, 48 and 50 as indicated, the welds being adapted to secure the adjacent channel faces of the reinforcing members 42 and 44 to the respective faces of the adjacent top and bottom channel members 38 and 40. Side members 52 and 54 also of channel cross section are in a later stage assembled together with top and bottom members and secured through welds located at 56, 58, 60 and 62, the welds securing the side members 52 and 54 to the top and bottom members 38 and 40 along the portions of one another that are in face to face or lap contact. In a center sill for railway use, for example, the particular channel members referred to may be rolled from as heavy strip stock as quarter-inch high tensile stainless steel and the individual welds securing two such members together are, therefore, effected through a pair of channel members, the total thickness of which may be as great as a half-inch. Thus such spot welds are of unusual size.

Referring again to Figs. 1, 2 and 3, it will be observed that the carriage 32 is provided with a welding gun 230 adapted to effect welds at the point 46, in an initial assembly step as is suggested in Figure 9. During this same initial assembly step welds 48 and 50 may be effected through the operation of the inclined welding guns 240 and 242, and subsequently the complete assembly, composed of top and bottom channel members 38 and 40 with their reinforcing channel members 42 and 44, may be assembled with the side channel members 52 and 54 and the welds 56, 58, 60 and 62 effected through the four welding guns 96, A, D, C, B, respectively, at spaced points along the beam.

In order to support the carriage 32 and the beam 34 in operative relation with respect to one another, the carriage 32 is adapted to roll upon rails 64 carried upon transverse ties 66 thus forming the track generally indicated by the reference numeral 30 in Figure 1. Upon the cross ties 66 and centrally with respect thereto are positioned a pair of longitudinally extending spaced I-beams 68 which in turn at spaced intervals support the work support arms 36, further details of which will be described hereinafter.

The carriage 32 as illustrated in Figure 4 is generally constructed of spaced side frames 70 and 72 connected together across the top thereof by a bridge or top framework member 74. Each side frame is composed of a lower sill 76 and one or more spaced uprights such as 78 spaced along the length thereof at convenient points. The sill 76 is provided with flanged wheels 80 which in turn roll upon the track 30 and are adapted to maintain the carriage aligned along the track with respect to the beam 34 throughout its operations thereupon as it traverses the beam 34 and track from one end to the other.

To move the carriage along the track there is provided a rack 82 adjacent to one rail of, and parallel with the track which is in turn adapted to be engaged by a pinion 84 carried upon a vertical shaft 86 journaled in a bracket 69 and the sill 76 of the carriage. Geared to shaft 86, as at 71, is a second shaft 91 journaled in the side frame. A convenient hand crank 88 at the side of the frame, and carried on a shaft 90, is adapted to drive the shaft 91 through intermeshing bevel gears 92 and 93 located on shafts 90 and 91, and hence move the carriage 32 along the track. Associated with the crank 88 is a stationary indexing plate 94 so that measured movements of the carriage may be effected. Thus, there is provided a carriage of generally inverted U section adapted to bridge over the work and form a support for welding guns, positioned for operation on the work, and which carriage is readily movable along the work.

To effect the vertical welds 56, 58, 60 and 62 between the channel members 38 and 40 and 52 and 54 of the center sill, the welding guns 96 are positioned on the inside of the side members 70 and 72 of the carriage. Such welding guns are supported from the side members at the top and bottom through identical top and bottom castings 98 and 100. As is illustrated, for example in Figure 6, two welding guns are supported upon each side of the carriage, one gun A being adapted to effect welds as indicated at 56 and the other, D, being adapted to effect welds as indicated at 58. Each of the guns is identical but the gun for effecting the welds 56 is inverted with respect to the gun which effects the welds 58. The end support castings 98 and 100 are also reversed with respect to one another as will hereinafter appear.

In order to effect the heavy welds contemplated it is necessary to apply heavy pressures to the welding electrodes and since the welding electrodes must overhang to a considerable extent to reach into the contour of the channel members of the beam to be welded, provision must be made to mechanically resist such torsion and other eccentric stresses which would be set up in each welding gun. Accordingly, as will be seen in Figure 6, each welding gun is carried upon a pair of spaced heavy guide rods 102 extending between the cast end supports 98 and 100. As is shown in section in Figure 6 the lower cast end piece 100 is provided with a cylinder bore 104 integral therein (see Figs. 6 and 11) and having an axis lying in substantially the same plane as that common to the axes of the rods 102. Slidably arranged upon the rods 102 are welding electrode carrier guide blocks 106 and 108, the former being provided with a piston rod 110 extending through the latter into the cylinder 104 wherein it is provided with a piston 112. The other block 108 through which the piston rod 110 passes is provided with an integral extension portion 114 forming a piston head likewise reciprocating within the cylinder 104.

The electrode carrying blocks 106 and 108 (see Figure 11) are provided with electrode carrying brackets 116 and 118 secured to the blocks through bolts 120, there being provided layers of insulation 122 and 124 between the brackets and bolts and their respective blocks. The bracket 116 is provided with a goose neck at the end thereof to support a welding electrode tip 126 in such a way as not to interfere with the flange 127 of the channel member 54. The lower electrode bracket is provided with an opposed electrode tip 128, the electrode tips 126 and 128 being adapted to engage the channel members 54 and 38 to effect a weld at the point 62'. (See Fig. 11.)

It will be seen that the electrode carrying blocks 106 and 108 are both slidable upon the rods 102 and carry the piston head 114 and the piston 112 within the cylinder bore 104. Thus, upon an introduction of fluid pressure within the cylinder bore 104 and between the piston 112 and piston head 114, the blocks 106 and 108 will be moved toward one another thereby engaging the welding tips 126 and 128 with the work. To assure positive separation of the welding electrodes after release of fluid pressure from the cylinder 104, coil springs 130 coaxially arranged upon the rods 102 and between the slidable blocks 106 and 108 which are adapted to cause the blocks to separate are provided. In order to restrict the extent of the separation of the welding electrodes upon the completion of a weld and so as to prevent the electrode tips from separating sufficiently to come in contact with the adjacent side walls or flanges, for example the flange 127 of the channel member 54 (see Fig. 11), a shoulder 132 concentric around the piston 114 is adapted to engage the end of the cylinder bore 104 as at 134, through one or more adjustment collars 136. The adjustment collars are removable since each collar is composed of two substantially semi-circular parts 135 and 137 hinged together as at 138. Thus, downward (see Fig. 6) or upward (see Fig. 11) movement of the block 108 and its electrode is adjustably limited. Movement of the block 106 as a result of the pressure of the springs 130 is limited by the adjustable threaded collars 140 arranged upon the extension of the end of the piston rod 110, the collars being adapted to abut a bell-shaped end enclosure 142 of the cylinder 104. It will readily appear that the collars 136 and 140 are effective to limit the separation of the welding electrodes regardless of whether the welding gun be positioned as illustrated in the right-hand portion of Figure 6, or inverted as in the left-hand portion of Figure 6, or, for example, as illustrated in Figure 11.

Engagement of the welding electrodes with the work is accomplished by introducing fluid under pressure to the space between the pistons 112 and 114 through the bore 144 extending through the center of the piston rod 110, which bore terminates in a transverse aperture 146 leading into the space between the pistons. Thus, by introducing fluid under pressure through the hollow piston rod, the piston and piston head may be forced to spread thereby causing the welding electrodes to engage the work under pressure.

So far, the description of the guns 96 applies to any one of the four guns in the same manner but for clarity, the separate guns will now be designated by the characters 96A, 96B, 96C and 96D, the respective guns being adapted to effect the welds 56, 62, 60 and 58.

In the operation of the vertically acting welding guns, means are provided for supplying fluid pressure to all the guns simultaneously and for applying electrical energy to the guns in sequence from a common transformer and through a distributing secondary switch. The secondary distributing switch is located upon the carriage as at 148, the same being located conveniently between the transformer 150 and the welding guns 96. See Figs. 1 and 3. Referring to Figures 16 through 23, the details and novel features of the distributor switch will appear.

In Fig. 17, the transformer leads 152 and 154 are shown connected to horizontal bus bars 156 and 158 (see also Figs. 3 and 15) and thence are connected to a pair of concentrically disposed semi-circular contact plates 160 and 162, through arms 159 and 161 extending radially from the plates, the arms having an elbow as at 161a (see Fig. 16). Since the general purpose of the switch is to distribute electrical welding energy to any one of the four guns 96 A, B, C or D selectively, or to other welding circuits as will hereinafter appear, the semi-circular plates are surrounded by a number of sector shaped plates, connected to the welding guns, and means are provided for selectively bridging connections between the central transformer connected semi-circular plates 160 and 162, and a pair of such sector shaped plates to complete a circuit from the transformer to a particular gun. In Fig. 17, the general arrangement of such sector shaped plates 164, adjacent the plate 160 is illustrated, as well as the arrangement of the sector plates 166 adjacent the semi-circular plate 162. Since the sector plates 164 and 166 are all identical, they are distinguished from one another by the characters A, B, C and D corresponding to the guns 96 A, B, C and D to which they are connected. In Fig. 16 there will appear the bridging blocks 168 and 170 which are adapted to complete the circuits to the various guns 96.

The construction of the switch and the bus bars connecting the transformer to the various welding guns is such as to minimize inductive reactance and to equalize the impedance to each of the guns. Accordingly, pairs of conductors are arranged in close relationship to one another in order to maintain the reactance as low as possible. Further, the bus bars are so connected as to provide a substantially uniform length of path with uniform characteristics for all welding guns.

The structure of the switch centers about a main support member 172 having a flat face 173 provided with a layer of insulation 174 and against which the plates 160 and 162 are secured as by bolts 175, the latter being insulated where they pass through the support member 172. The sector shaped plates 164 and 166 are arranged around the shoulder 176 formed by the periphery of the semi-circular contact surfaces of the plates 160 and 162, suitable insulation 177 being provided. The sector shaped plates are secured in place by bolts 178 passing through the base portions of the plates 160 and 162 and also the main support member 172, suitable insulation being provided as at 179, where such bolts pass through the support end plates 160 and 162. Additional support to the sector shaped members 164 and 166 is provided for by the insulated bolts 180 passing through the support member 172, a spacer member 181 and the members 164 and 166. As illustrated in Figure 17, two of the members 164 and 166, namely, 164D and 166A, parallel the arms 159 and 161 leading to the transformer and are insulated therefrom as at 182, in Figure 16 each of the arms 164 and 166 having right angle extension portions as at 183 and 184 respectively, the extension portion leading to a peripheral circular set of bus bar connections as indicated in Figures 15 and 17, a further description of which will appear hereinafter in connection with the bus bar connections to the welding guns.

As has been previously stated connections from the plates 160 and 162, which are connected to the terminals of the transformer, to a pair of sector plates 164 and 166 are effected through bridging connector blocks 168 and 170. The bridging blocks as are illustrated in Figure 16 are pivotally supported as at 185 upon insulated brackets 186 carried by a transverse symmetrical bracket 187, the bracket being keyed upon a splined shaft 188 extending through a central bore in the support member 172. Integral with the shaft 188 and upon the end thereof beyond the bracket 187 is provided a piston 189 reciprocable in a cylinder bore 190 formed in a member 191 supported from the support member 172 through the shouldered studs 192. Fluid pressure admitted to the cylinder bore 190 is adapted to move the piston and bracket 187 carrying the bridging connector blocks 168 and 170 into engagement with the plates 160 and 162 and a pair of the plates 164 and 166 to provide an electrical connection therebetween. Upon release of the fluid pressure within the cylinder bore 190 the bridging blocks 168 and 170 are adapted to be removed from electrical connection with the plates 160, 162, 164 and 166 by reason of a concentric spring 194 arranged about the shaft 188, the spring bearing upon one side of the bracket 187 and a thrust bearing 189 bearing against the support member 172.

To rotate the switch to various angular positions to engage various pairs of sector plates 164 and 166 and in order to insure that the angular position will be such as to prevent the bridging blocks from contacting more than one of the contact plates 164 or more than one of the contact members 166 at a time, a Geneva movement is provided so that the bracket 187 may be positioned in any one of 8 angular positions spaced 45 degrees from each other. To effect movements of the bridging blocks 168 and 170 to the various angular positions a hand crank 195 journaled in the support member 172 is provided, the same carrying an eccentric pin 196 acting upon the Geneva gear 197 in the usual manner. The Geneva gear is splined on shaft 188 so that the shaft may reciprocate with respect to the gear when it is desired to engage and disengage the bridging blocks 168 and 170 with the contact plates. The Geneva gear is slotted as at 198 to receive the pin 196 and notched as at 199 to coact with a circular portion 200 upon the crank 195 whereby movement of the Geneva gear is prevented except when the crank is turned sufficiently to engage the pin 196 and one of the slots 198 and to release the notch 199. To insure that the bridging blocks 168 and 170 are spaced from the contact plates 160, 162, 164 and 166 during the shifting operation a cam 201 is provided on the crank 195, which cam coacts with the fluid pressure valve 202 controlling the supply of fluid pressure to the cylinder bore 190. Thus, when the crank is in the position shown in Figure 15 locking the Geneva gear in one of eight of the angular rest positions, the valve 202 is shifted to permit the flow of fluid pressure into the cylinder bore 190 to urge the bridging blocks 168, 170 into engagement with the plates 160 and 162 and the adjacent sector plates 164 and 166 aligned with the bridging blocks. Upon rotating the crank 195 through a slight angle less than that necessary to shift the annular position of the bracket 187 and the bridging blocks 168 and 170, the cam 201 will permit the valve 202 to shift, to relieve the fluid pressure from the cylinder bore 190, thereby permitting the spring 194 to expand and force the bridging blocks 168 and 170 out of engagement from the contact plates. Thereupon further rotation of the crank 195 will bring the pin 196 into engagement with the Geneva gear 197, rotating the same and shifting the angular position of the switch 45 degrees for each rotation of the crank 195 and upon completion of the rotation of the crank 195 back to the position shown in Figure 15, the cam 201 will again shift the valve 202 to introduce fluid pressure into the cylinder bore and engage the bridging blocks 168 and 170 with the contact plates.

Referring to Figure 17 it will appear that each of the diametrically opposed contact members, for example, 164A and 166A are provided with circular connecting bus bars 204 and 206, each of which has a combined circular length of half of the circumference of the switch. For example, the bus bar 204A added to the bus bar 206A extends substantially 180 degrees around the switch. Similarly, the circular portion of the bus bar 204C and 206C also equals an arcuate path of 180 degrees. Thus the length of the current travel path to the point at which the bus bars 204 and 206 lead away from the switch is the same for all pairs of contacts. The bus bars 204 and 206 as they lead away from the switch are provided with parallel end portions 208A through D and 210A through D, which parallel portions are suitably insulated from one another and joined to transversely extending bus bars 212 and 214A through D. Connections to the welding guns 96A through D are completed through bars 216 and 218 and flexible jumpers 220 completing connection to the lugs 116 and 118 of each of the welding guns. Each of the bus bars 216 and 218 has a horizontal portion connecting to the bars 212 and 214 and an intermediate vertical portion and a horizontal portion to which the jumpers 220 are connected.

Through similar sets of bus bars each of the welding guns 96 may be connected to the transformer through the secondary switch by the rotation of the crank through a single revolution, each revolution shifting the distributor switch through an angle of 45° as previously explained. Thus, with the carriage positioned at any particular point along the track all four of the welding guns 96 may be brought into engagement with the work and welding current distributed to the individual guns in sequence through the operation of the distributing switch 148. As soon as a secondary connection is made to a gun, the gun may be fired, that is welding current caused to flow therethrough, to effect the weld and thereafter the secondary may be shifted to another gun and that one fired likewise. Firing is simplified by providing a timer control switch 196' (see Fig. 4) immediately behind the handle 195' of crank 195, and providing the handle with a push pin 197' adapted when aligned with switch 196' by proper positioning of crank 195 to operate the timer switch. After each of the four welding guns 96 have effected a weld, the welding electrodes of the guns may be retracted away from the work, the carriage moved along the track a prescribed distance, and the operation repeated. At this point it may be preferable to describe the source of fluid pressure employed to engage the welding electrodes under pressure. For this purpose located on the top of the carriage is a motor driven fluid compressor 300 adapted to draw fluid from a reservoir 302 located therebelow through a suction line 304. Through a pressure regulating valve 306 and an over pressure return pipe 308 a source of suitable pressure is provided in the pipe line 310, which pipe line extends to a control valve 314. From the control valve fluid pressure is delivered to the welding guns 96, all of which are connected in parallel. The control valve 314 is adapted to supply fluid pressure to the guns or permit the fluid pressure to exhaust from the guns into the reservoir 302.

As has been previously described, before the final assembly which is effected by the welding guns 96, a pair of subassemblies composed of the top and bottom channel members 38 and 40 and their reinforcing channel members 42 and 44 are fabricated. During such procedure a channel member and its reinforcing channel are held in the work support arms 36 in the manner as indicated in Figure 9 and initially a plurality of welds are effected at spaced intervals along the center line of the channel as indicated at 46. The welding gun employed for this purpose is the previously described gun 230 supported from the scaffolding 238 by a spring counterbalance 232 and through a trolley 234 transversely movable upon the scaffolding supported track 236. The welding gun itself comprises a C-frame 250 having a cylinder bore 252 in one end and a welding electrode bracket 254 insulatingly supported at the other end, the bracket carrying a welding electrode 256 substantially axially aligned with the cylinder bore 252. The other welding electrode 258 is carried upon the end of the piston rod 260, the piston rod having a piston 262 reciprocable in the cylinder bore 252. Suitable stuffing and guide bushings 264 are provided in the end of the cylinder bore 252 and insulating material 266 is provided between the piston rod and the welding electrode 258. Fluid pressure is admitted to the cylinder bore through a flexible conduit 268 secured to an aperture in the cylinder head 270. Connections to the welding gun are made through the leads 272 and 274 and thence through flexible conductors (not shown) to the ends of bus bars 276 and 278, the latter being connected in parallel with the bus bars of one of the welding guns 96 as will be hereinafter described.

The angular disposed welds 48 and 50 are effected through the guns 240 and 242, each supported upon the end of the side frames 70 and 72, the side frame 70 being extended to the left a slight distance so as to stagger the arrangement of the guns. The guns 240 and 242 being otherwise similar, a description of the gun 242 as more particularly illustrated in Figures 12 and 13 will suffice. On the end of each of the side frames 70 and 72 is provided an oblique transverse way 350 upon which is adjustably mounted a bed plate 352 having a pair of spaced integral axially aligned cylindrical bearing brackets 354 and 356. Reciprocably mounted within the bearing brackets is a fluid pressure cylinder 358 carrying a C-bracket 360 having at its outer end a welding electrode carrying bracket 362 with a welding electrode tip 364 axially aligned with the cylinder. Reciprocably mounted within the fluid pressure cylinder is a piston 366 having a piston rod 368 extending out through the end of the cylinder through a bearing sleeve 370 and carrying on the end thereof a welding electrode 372. The bracket 362 and the welding electrode 372 are insulated from their respective C-bracket and piston rod so that the flow of welding current is restricted to the parts immediately adjacent the welding electrode tips. To key the cylinder 358 and the C-bracket 360 carried thereby from rotation within the cylindrical bearing brackets 354 and 356, an eccentric pin 374 is provided, the same extending parallel with the axis of the cylinder but outside thereof, the pin being rigidly secured to the C-bracket 360 and reciprocably received within a corresponding aperture 376 in an extension portion of the bracket 354. Thus, the cylinder 358 is permitted to reciprocate within the brackets 354 and 356 but restrained from rotating therein. The piston 366 is urged toward the head end of the cylinder 358 by a spring 378 arranged around the piston rod 368 and compressed between the underside of the piston 358 and a shoulder 380 in the bore of the cylinder. The cylinder at its head end is provided with a cylinder head 382 through which fluid pressure is admitted through the flexible connection 384 and the head structure is such as to provide a shoulder 386 adapted to bear against the bracket 354 to limit sliding movement therethrough in one direction. On the other hand, the piston rod 368 on the end to which the welding electrode 372 is secured is provided with a collar 388 adapted to bear against the bracket 356 to limit movement of the piston rod with respect to the bracket in one direction. The pressure of the spring 378 acting between the piston and the shoulder 380 within the cylinder tends to maintain the collar 388 of the piston rod in engagement with the bracket 356 and at the same time maintain the cylinder head structure and its shoulder 386 in engagement with the bracket 354 and thus establish the retracted positions of the welding electrodes 372 and 364. Thus, by suitably positioning the bed plate 352 upon the way 350 so as to center the electrodes with regard to the work, namely the channel member 40 and its reinforcing member 44, upon the application of fluid pressure to the cylinder and behind the piston the electrodes 364 and 372 may be moved into engagement with the work through a floating action of both parts. Electrical connections are made to the welding electrodes through connection brackets 390 and 392 and flexible conductors 394 and 396 leading to bus bars 398 and 400, connections from which lead to the distributing switch in a manner to be described hereinafter.

Connections to the welding guns 230, 240 and 242 are made to the distributor switch 148 through bus bars illustrated in end elevation in Figure 5. For example, the bus bars for the welding gun 230 are indicated at 276 and 278 as previously referred to, the bus bars extending longitudinally through the carriage as indicated in Figures 2 and 3 to two of the transverse bus bars 212C and 214C leading to the distributor switch bus bars 208C and 210C. In a similar fashion the angle gun 240 illustrated in Figure 5 on the left is connected through bus bars 398 and 400 and longitudinally extending bus bars 402 and 404 to transverse bus bars 212B and 214B and in turn connected to the distributor switch bus bars 208B and 210B. Likewise the angle gun 242 is connected to bus bars 406 and 408 which extend longitudinally through the carriage to transverse bus bars connecting with the distributor switch bus bars 208A and 210A.

Fluid pressure is delivered to the angle guns 240 and 242 and the gun 230 through fluid pressure lines so that the fluid pressure is controlled by the manual valve 314, each of the lines, however, being provided with suitable valves 410, as in the line to the gun 230, and 412, as in the line leading to the two angle guns 240 and 242. Thus, by closing the valve 312 to the guns 96 and opening the valves 410 and 412 the distributor switch, while energizing in three of its positions any one of the bus bars to the angle guns or the gun 230 as well as to the bus bars to any one of three of the guns 96, A, B or C nevertheless since fluid pressure to close the contacts upon the work would only be applied through the fluid pressure lines controlled by the valves 410 and 412, the guns 96 must remain with the electrodes spaced from the work as the work passes therethrough and hence no weld can be effected thereby. If the valve 312 be opened and the valves 410 and 412 closed, then the distributor switch would be effective to distribute welding energy to any one of the four guns 96, A, B, C and D it appearing that the welding guns 230, 240 and 242 will be maintained with their welding contacts spaced apart and out of contact with the work. Thus, at will an operator may select which group of guns fluid pressure is to be distributed to and at will select the particular gun of the selected group to which welding current is to be delivered.

Previous reference has been made to the support for the work which in the present instance is adapted to hold the work rigidly in proper position while being operated upon. The work support consists primarily of a plurality of spaced upright supports 450 and at the upper end thereof a suitably shaped support pad 452 for receiving the channel shape of the bottom channel member 40, the particular structure being best illustrated in Figures 7 and 8. In operating upon the work through the welding guns 96, all the members of the finished beam are held in proper position through a clamping bridge associated with each support 450, the clamping bridge comprising arms 454 and 456 pivoted upon the base portion 458 of each upright support 450. One of the arms 456 is hingedly provided at the top thereof with a bridge member 460 which is adapted to be swung into horizontal position over the work and to be rigidly secured against a seat 462 at the extremity of the arm 454, a yoke 464 pivoted at 466 on the arm 454 being provided for this purpose.

The yoke is also provided with a toggle mechanism for clamping the bridge member 460 in tight engagement with the end of the support arm 454, which toggle mechanism comprises a short arm 468 pivoted on the extreme end of the arm 454, the short arm being provided with adjustable abutments 470 adapted to swing into engagement with the top surface 472 of the bridging member 460. A link 474 pivotally connected between the yoke 464 and the short arm 468 is adapted to take a substantially vertical position as indicated in Figure 7 when the yoke 464 is swung to a vertical position thereby acting as a toggle to urge the adjustable abutment 470 into tight engagement with the upper surface 472 of the bridging member 460.

The yoke 464 is provided with a stop 465 which is adapted to engage the edge of the link 474 when the adjustable abutment 470 is urged into engagement with the bridge 460, the stop 465 preferably being so arranged as to permit the yoke 464 to be swung slightly past dead center so that a locking action is effected. Thus, when in locked position the upper pivot 475 of the link 474 and the pivot 466 are on a line extending slightly to the left of the lower pivot 477 of the link 468. When the yoke 464 is swung to the release or dotted line position shown in Figure 7, it engages a stop 476 on the arm 454.

The bridge member 460 is provided with a tongue 461 which is received in a corresponding recess 478 in the end of the arm 454 so that when in clamped position the spacing between the arms 456 and 454 is rigidly fixed. Through the use of cheek plates 480 and 482 on the sides of the arms 454 and 456, accurate lateral positioning of the members to be welded with relation to one another is assured. Through the bracket-like projections 484 and 486 carried on the arms and the faces thereof engaging the channel members of the workpiece and the face 488 of the bridging member 460 and the end of the upright support 450, accurate vertical positioning of the parts is assured.

Since as the carriage traverses the length of the workpiece, interference would result from the various spaced supports and the welding guns, provision is made for swinging the arms 454 and 456 out of the way of the welding carriage, this being accomplished through a pivotal connection of each of the arms 454 and 456 upon the transverse member 458 as at 490. Thus, as is indicated in Figure 1 and also in Figures 3 and 4, the arms may be readily swung to a substantially horizontal position away from the work so as to permit the carriage to traverse the work without such interference. The arms are provided in addition to the pivot 490 with a foot portion 492 adapted to be bolted to the top face 494 of the transverse member 458 through a pivoted eye bolt 496, the foot being slotted to receive the eye bolt and to permit its quick movement out of the way upon loosening the nut 498 thereon. Thus, as the welding carriage traverses the work, the arms 454 and 456 of the particular supports adjacent the carriage may be quickly swung from the vertical position to the horizontal position out of the way of the carriage by first releasing the bridge portion 460 and swinging the same beyond the position shown in dotted lines in Figure 7 and thereafter loosening the eye bolts and swinging the arms to horizontal position. As soon as the carriage has traversed the particular portion involved, the arms are again raised to vertical position, the eye bolts 496 swung into place and tightened and the bridge member 460 again placed across the top of the work and clamped by swinging the yoke 464 into vertical position. It will be seen that in treating long beams the presence of a plurality of supports fore and aft of the carriage would be sufficient to hold the workpieces in proper assembled position while one or more of the supports are swung into the horizontal carriage clearing position. It will be noted that the upstanding supports 450 do not interfere with the mechanism of the carriage and consequently may remain in position and lend support from the underside as will appear from the illustrations.

Before the final assembly of the top and bottom channel members and the side channel members it is preferable to apply a reinforcing channel to each of the top and bottom channel members and this is accomplished, as has been described, through the use of the angle guns 240 and 242 as well as the suspended gun 230. To secure the top and bottom channel members in position upon the support 450 during such operation, a toggle device is provided which is adapted to be positioned between the bridge 460 and the inside of the channel reinforcing member 42 as illustrated in Figures 9 and 10. The toggle device comprises expansible telescopic members disposable between the underside of the bridge 460 and the channel member 42, a pair of toggle links 504 and 506 pivoted to the telescopic members 500 and 502 being adapted to expand the telescopic members with considerable force. The lever 504 is provided with a handle 508 and a stop 510 which is adapted to engage the side of the link 506 as at 511 after the pivot 512 between the links has passed the line of the pivotal centers 514 and 516 connecting the links 504 and 506 with the telescopic members 500 and 502.

It will thus appear that a novel apparatus is provided for working upon elongated objects. In welding a beam, of the type described, it is merely necessary to position the carriage at one suitable point, operate the valve 314 to engage the group of guns 96 with the work, rotate the crank 135, four times, while pressing the button 137' between each revolution. Thereafter rotation of the crank 88 thru a prescribed angle places the carriage at a new stage, at which the operation is repeated. Power may be supplied to the transformer 150 in any suitable manner. In the apparatus illustrated however, the conduit 520 is provided with power wires tapped as at 522 periodically and connected to convenient sockets 524, into which a plug on the end of a short jumper leading to the transformer may be inserted.

Fast welding accurately placed may be accomplished, producing structures having strength in accordance with specifications, by relatively unskilled operators.

Though only a single form of the invention particularly applicable to the beam shown, is illustrated and described the invention is not limited thereto but may be embodied in various forms as desired. As various changes in construction and arrangement of parts may be made without separating from the spirit of the invention as will be apparent to those skilled in the art, reference will be had to the appended claims for a definition of the limits of the invention.

What is claimed is:

1. A welding apparatus for effecting a plurality of welds along the length of an elongated object, comprising a track, means for supporting an object along and substantially parallel to said track, a carriage adapted to travel upon said track having spaced side walls and a connecting top structure adapted to form an inverted U sectioned frame encompassing a portion of the length of an object in said supporting means, a welding gun carried upon the inside of one of the wall structures and adapted to effect welds upon an object carried on said supporting means at a plurality of stages, and means for moving said carriage along said track from stage to stage, said welding gun interfering with at least a portion of said supporting means, and means associated with said supporting means for temporarily removing the interfering portion of said supporting means to a non-interfering position.

2. A welding apparatus for effecting a plurality of welds along the length of an elongated object comprising a track, means supporting an elongated object above, along and substantially parallel to said track, a carriage adapted to travel upon said track having spaced side walls and a connecting top structure adapted to form an inverted U sectioned frame encompassing a portion of the length of an elongated object, a welding gun carried upon the inside of one of the wall structures and adapted to effect welds upon an object carried on said supporting means, and means for moving said carriage along said track, said supporting means including a plurality of spaced upright supporting members, and cooperating object embracing members, said cooperating members positioning the elongated object with relation to the track and carriage and lying in the path of said welding gun and carriage, and means for moving the object embracing members out of embracing position to a position out of the path of said welding gun and carriage.

3. A welding apparatus for operation upon an elongated workpiece and including a carriage movable along guides extending on each side of the work, said carriage having side and top walls, a support for the work extending well into the space between said side walls, a plurality of welding guns on said carriage for cooperation with opposite sides of the work, and another welding gun overhanging an end portion of the carriage and adjustable with its support laterally of the carriage and work as well as vertically thereof whereby said last mentioned gun may be moved into the general plane of either side wall of the vehicle to be out of the way of the work.

4. A welding apparatus including a carriage for welding guns movable along guides, a work holder including an upstanding supporting member pivotally mounted adjacent a lower end portion thereof whereby said member may be swung down to a position out of the way of said carriage and its guns and be raised into operative position after movement of the carriage.

5. A welding apparatus including a carriage for welding guns movable along guides, a work holder including an upstanding supporting member pivotally mounted adjacent a lower end portion thereof whereby said member may be swung down to a position out of the way of said carriage and its guns and be raised into operative position after movement of the carriage, said pivotal supporting member of the work holder being located between said guides.

6. A welding apparatus for an elongated work piece and comprising a carriage movable along guides and said work piece and carrying welding guns for engagement with said work piece, a work holder located between said guides and including side members and a top adapted to clamp the work between them, said top being removable from its position connecting the upper ends of the work holder side members to enable the welding guns to have access to the work piece as the carriage is moved along its guides.

7. A welding apparatus including an elongated work holder, guides between which the work holder is placed, a carriage movable along said guides, said carriage having sides and a top each spaced from the work holder and work, welding guns carried by said carriage, control means for engaging a plurality of said guns with the work, means for supplying welding current to the guns in sequence, said last mentioned means including a distributor having somewhat arcuate conductors and being located in spaced relation to the sides, work holder, and work, whereby the conductors are inductively separated from the holder, work, and carriage sides to minimize inductive losses therein.

8. A welding apparatus including an elongated work holder, guides between which the work holder is placed, a carriage movable along said guides, said carriage having sides and a top each spaced from the work holder and work, symmetrically positioned welding guns carried by said carriage, control means for engaging a plurality of said guns with the work, means for distributing welding current to the guns, and low resistance conductors of substantially uniform length intermediate said distributing means and guns.

9. A welding apparatus including an elongated work holder, guides between which the work holder is placed, a carriage movable along said guides, said carriage having sides and a top each spaced from the work holder and work, symmetrically positioned welding guns carried by said carriage, control means for engaging a plurality of said guns with the work, means for distributing welding current to the guns, and conductors having substantially uniform impedance between the said guns and distributing means.

10. The combination as stated in claim 9, with the conductors between the guns and distributing means being in close contiguity whereby the reactance of the gun circuit is diminished.

11. A welding apparatus including an elongated work holder, guides between which the work holder is placed, a carriage movable along said guides, said carriage having sides and a top, each spaced from the work holder and work, symmetrically positioned welding guns carried by said carriage, control means for engaging a plurality of said guns with the work, means for supplying welding current to the guns in sequence, said last mentioned means including a distributor having arcuate conductors located in spaced relation to the carriage top and sides, the work holder and work, whereby the conductors are inductively separated from the holder, work and carriage sides to minimize inductive losses therein.

12. A welding apparatus including a carriage for welding guns movable along guides, a work holder including a central stationary member and lateral and movable upstanding supporting members pivotally mounted adjacent the lower end portion thereof, whereby said movable members may be swung down to a position out of the way of said carriage and its guns and be raised into operative position after movement of said carriage.

13. A welding apparatus including a carriage for welding guns movable along guides, a work holder including a central stationary member and lateral movable members pivotally mounted adjacent the lower end portion thereof, and a top member pivotally mounted on one of said lateral members adapted to form a closure with the other lateral member, and means for clamping said top member in closed position above said stationary member.

14. In a welding apparatus including a carriage for welding guns movable along guides, a work holder comprising a base element transversely positioned between said guides, a stationary support member positioned centrally on said base element, movable support members positioned on opposite sides of said stationary support member, said movable members being pivotally mounted adjacent their bases for movement to and from said base, a top member pivotally connected to an end of one movable member and adapted to form a closure over the central support member in engagement with the other movable member, and means for clamping said top member in closure position whereby the work is fixedly held between the top member and stationary support.

15. A welding apparatus including a work holder, guides between which the work holder is spaced, a carriage movable along said guides, welding guns carried by said carriage, controlling means for engaging a plurality of said guns with the work, means for distributing welding current to the guns and conductors having substantially uniform impedance between said guns and distributor means.

16. A welding apparatus including a carriage for welding guns movable along guides, a work holder including an upstanding supporting member pivotally mounted adjacent an end portion thereof whereby said member may be moved to a position out of the way of said carriage and its guns and be moved into operative position after movement of the carriage.

WILLIAM A. WEIGHTMAN.

CERTIFICATE OF CORRECTION.

Patent No. 2,339,826.  January 25, 1944.

WILLIAM A. WEIGHTMAN.

It is hereby certified that error appears in the printed specification of the above numbered patent requiring correction as follows: In the grant, line 7, title of invention, for "CENTER SILLS" read --WELDING APPARATUS--; and in the heading to the printed specification and drawings, for "CENTER SILL" read --WELDING APPARATUS--; and that the said Letters Patent should be read with this correction therein that the same may conform to the record of the case in the Patent Office.

Signed and sealed this 14th day of November, A. D. 1944.

Leslie Frazer
(Seal) Acting Commissioner of Patents.